United States Patent
Bahr

(10) Patent No.: US 6,446,422 B1
(45) Date of Patent: Sep. 10, 2002

(54) CHAIN DRIVE CUTTING MECHANISM FOR COMBINE

(76) Inventor: Rex A. Bahr, P.O. Box 4328 1411 Fairlawn, Apt. 100, Topeka, KS (US) 66604-0328

( * ) Notice: Subject to any disclaimer, the term of this patent is extended or adjusted under 35 U.S.C. 154(b) by 0 days.

(21) Appl. No.: 09/476,593

(22) Filed: Dec. 31, 1999

(51) Int. Cl.$^7$ .......................... A01D 34/13; A01D 34/18
(52) U.S. Cl. .......................................... 56/298; 56/307
(58) Field of Search .......................... 56/307, 308, 309, 56/310, 311, 312, 313, 298, 244, 291, 296

(56) References Cited

U.S. PATENT DOCUMENTS

| | | | | |
|---|---|---|---|---|
| 12,327 A | * | 1/1855 | Cutter | 56/291 |
| 94,141 A | * | 8/1869 | Sisum | 56/291 |
| 157,243 A | * | 11/1874 | Sweet | 56/291 |
| 334,304 A | * | 1/1886 | Ghormley | 56/291 |
| 369,095 A | * | 8/1887 | Brown | 56/291 |
| 374,397 A | * | 12/1887 | Clark | 56/291 |
| 391,142 A | * | 10/1888 | Gumz | 56/291 |
| 395,493 A | * | 1/1889 | Hanson | 56/291 |
| 431,799 A | * | 7/1890 | Brown | 56/291 |
| 468,859 A | * | 2/1892 | Wright | 56/291 |
| 726,392 A | * | 4/1903 | Bailey | 56/291 |
| 1,353,891 A | * | 9/1920 | Cook | 56/291 |
| 1,409,507 A | * | 3/1922 | Wilson | 56/291 |
| 1,532,279 A | * | 4/1925 | Ullom | 56/291 |
| 3,284,994 A | * | 11/1966 | Hamel | 56/298 |
| 3,401,512 A | * | 9/1968 | Pool et al. | 56/298 |
| 3,577,716 A | * | 5/1971 | McCarty | 56/297 |
| 4,023,333 A | * | 5/1977 | Anderson | 56/296 |
| 4,070,810 A | * | 1/1978 | Brakke | 56/291 |
| 5,845,474 A | * | 12/1998 | Loftus | 56/291 |
| 5,875,624 A | * | 3/1999 | Olinger | 56/244 |

* cited by examiner

Primary Examiner—Robert E. Pezzuto
Assistant Examiner—Árpád Fábián Kovács
(74) Attorney, Agent, or Firm—Bruce J. Clark

(57) ABSTRACT

A continuous chain link cutting mechanism for agricultural combines and the like, having a continuous chain comprised of interconnecting chain link sections, having alternate outwardly extending cutting blades comprising the top link of alternate sections, rock guard having blade receiving slit therein, recess for receiving a channel guide member, a polyethylene channel guide member in which the cutting chain moves in a continuous fashion, wherein the channel guide has a front top channel edge flush with the bottom of the rock guard slit. The rock guard is attached to an elongated attachment bar, and top guide, centered between alternating rock guard is affixed to the attachment bar.

2 Claims, 4 Drawing Sheets

CHAIN DRIVE CUTTING MECHANISM FOR COMBINE

BACKGROUND OF INVENTION

The present invention relates to the field of combines, in particular the cutting mechanisms. Cutting mechanisms currently used are of the reciprocating type. Reciprocating cutting mechanisms have the distinct feature of causing significant and loud vibration, and as a result cause significant wear and tear as the cutting mechanism is constantly, with great force, reversing directions. A great amount of force is created on each movement that results from the significant kinetic energy, which force is nearly instantly reversed in the opposite direction as reciprocating action occurs, causing great vibration and great wear and tear on the mechanical parts that cause the reciprocating action. Resulting costly repairs cause costly downtime as the blades and other parts are replaced and maintained.

Moreover, the mechanics of a reciprocating action allow only a limited speed of the cutting action and thus limit the speed of the machine moving through the field being cut.

The continuing rotation mechanisms use less energy, have low maintenance, and are cheaper in the long run. However, it will be seen that none of the known continuous cutting mechanisms disclose the present invention as claimed.

The present invention utilizes commonly available chain link mechanisms, modified as shown to accept the appropriate cutting blades, traveling within a removable and replaceable polyethylene (preferably CHNW polyethylene) guide channel, with a center placed top guide piece that itself is adjustable and easily accessible. The guide, preferably hard plastic, also acts as a liner that can be less expensive, readily available, and replaceable. Moreover, it replaces the risk of sparks that might cause field fires. Most of the parts are easily manufactured or use off the shelf parts, to create a smooth, continual motion cutting mechanism.

The instant invention is a simpler design requiring fewer parts and results in a lighter weight mechanism. The design is also such that it is flexible such that the mower board can bend and not cause adverse structural mechanical effects. Moreover, the device is flexible in that it can be utilized to run vertical as well as horizonal.

Furthermore, the device is self-cleaning inasmuch as it rotates in one direction and can be reversed when necessary, for example when it plugs up. Furthermore, reversing the direction still allows cutting action while providing more even wear and tear. Reciprocating sickles often are plugged because they are consistently operating in one location and because they cut in batches as opposed to a continual cut. This batch cutting is what primarily causes the shock and vibration.

Furthermore, the invention should last hundreds of hours, if kept clean, and will allow one to cut at the speed limit of most current machines in typical terrains.

Consequently, it will be seen, that it is the object of the invention to create a continual chain cutting mechanism and eliminate the reciprocating action, so as to reduce the maintenance required and to eliminate expensive down time of the combine. It is a further object of the invention to use standard off the shelf parts or easily manufactured parts so as to create a relatively inexpensive, easy to install and effective cutting mechanism. It is a further object of the invention to create a mechanism that is smooth and relatively quiet in operation. Other objects and features of the invention will become apparent as disclosed in the specification.

Other objects and features of the invention and the manner in which the invention achieves its purpose will be appreciated from the foregoing and the following description and the accompanying drawings which exemplify the invention, it being understood that changes may be made in the specific method and apparatus disclosed herein without departing from the essentials of the invention set forth in the appended claims.

DESCRIPTION OF THE PREFERRED EMBODIMENT

Figure 1:
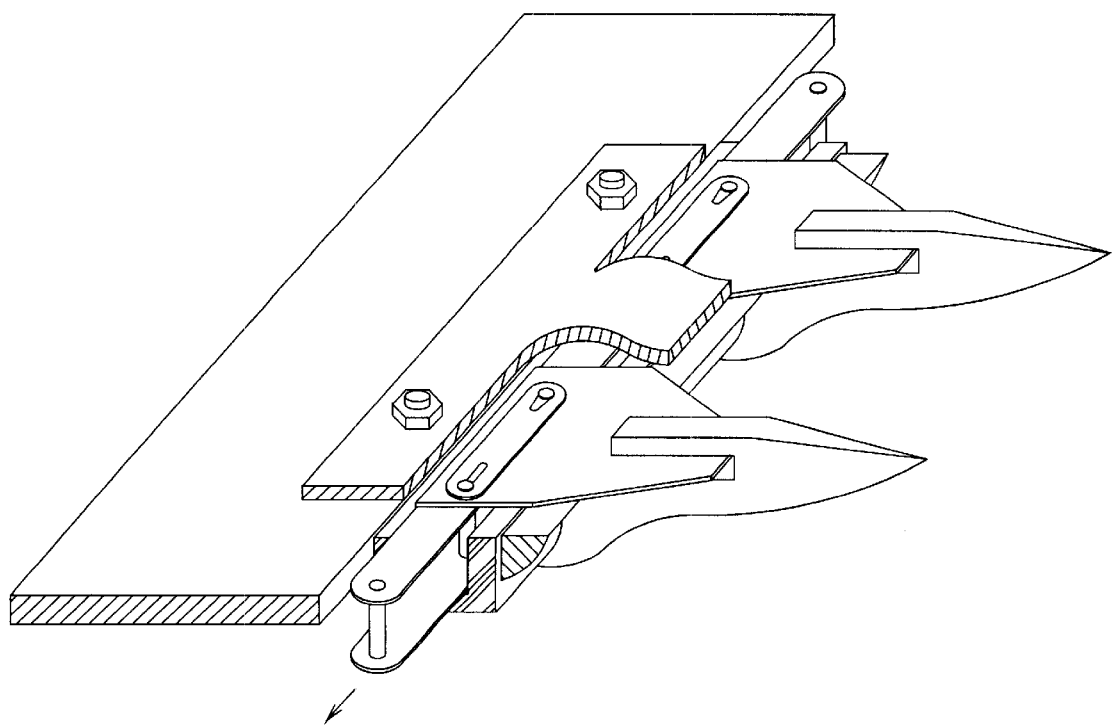
FIG. 1 is a perspective view of the invention in place.
Figure 2:
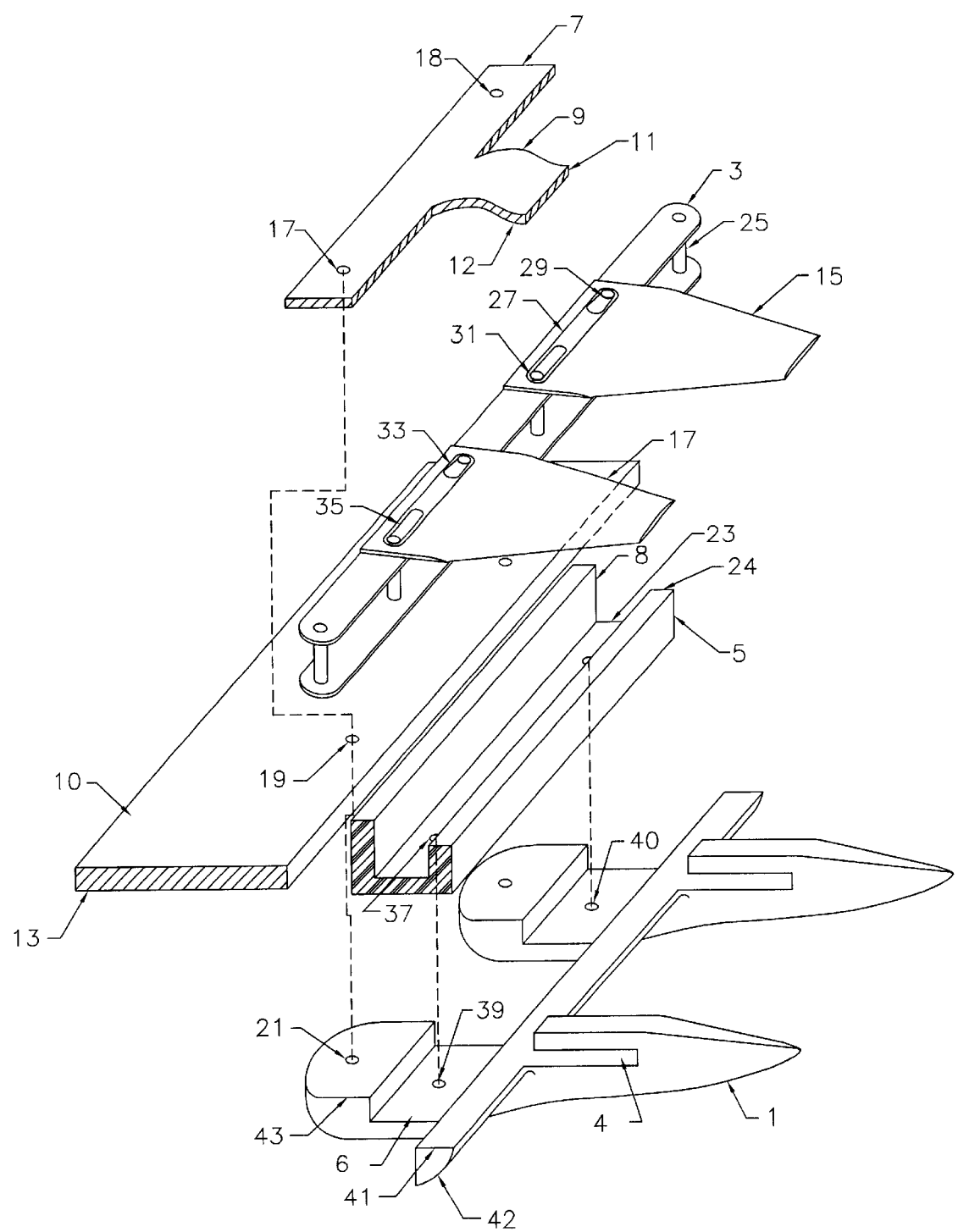
FIG. 2 is an exploded view of the invention and its parts.

The invention, shown in FIG. 1 in its completed form, is shown in FIG. 2 in its exploded form. Rock guard 1 is standard in reciprocating machines, including the slot 4 for guiding the blade and holding the material vertical to prevent it from bending, thus allowing the material to be cut. The recess 6 is designed so as receive the plastic channel 5. This channel member 5 is secured by the hold down plate 7 at recess 20. If necessary, the channel member can be secured using bolts or screws through holes 37 and 39. Hold down plate 7 has hold down extension 9 that reaches over the channel (and chain) and extends back down to hold down the blade section, thus securing the chain slidably in place. It does not, in the preferred mode, secure the chain directly above the chain itself. A common bolt or other securing means also secures the hold down plate 7 through holes 17, 19 and 21. The top 3 of the chain is in the preferred mode, slightly lower (preferably ⅛") than the top 8 of the channel 5. The front edge 24 of the channel is slightly higher than the bottom of the slit 4.

The channel member 5 is sufficiently long to correspond to the number of rock guards, and thus corresponds to the overall intended cutting width. It (channel member 5) has guide channel 23 that is just large enough for the cutting chain to ride therein and slide smoothly. There are numerous available hard, yet nearly frictionless, plastics available for its construction. This piece can be easily made in lengths, and easily cut to smaller size pieces, if necessary, and each piece is easily replaceable by simply loosening the hold down plate 7 and pulling the channel out.

The cutting chain 3 slides within the channel and it is a continuous chain being driven, in the preferred mode, utilizing sprocket or similar type mechanisms at both ends of the attachment bar, which sprocket mechanisms are rotated utilizing any typical motor or engine means coupled thereto. Consequently it will be seen that the attachment bar 13, although envisioned as a single elongated bar approximately the length of the intended cutting path, the cutting chain has a plurality of blades continuously moving within the channel member 5 parallel to the attachment bar. The attachment bar can be several smaller bars if necessary.

Figure 3:
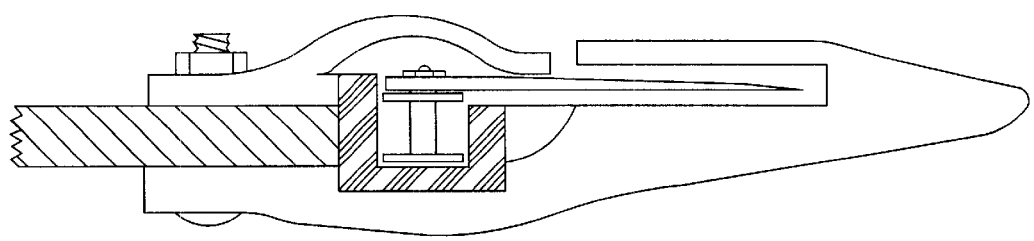
FIG. 3 is a side view of the invention.
Figure 4:
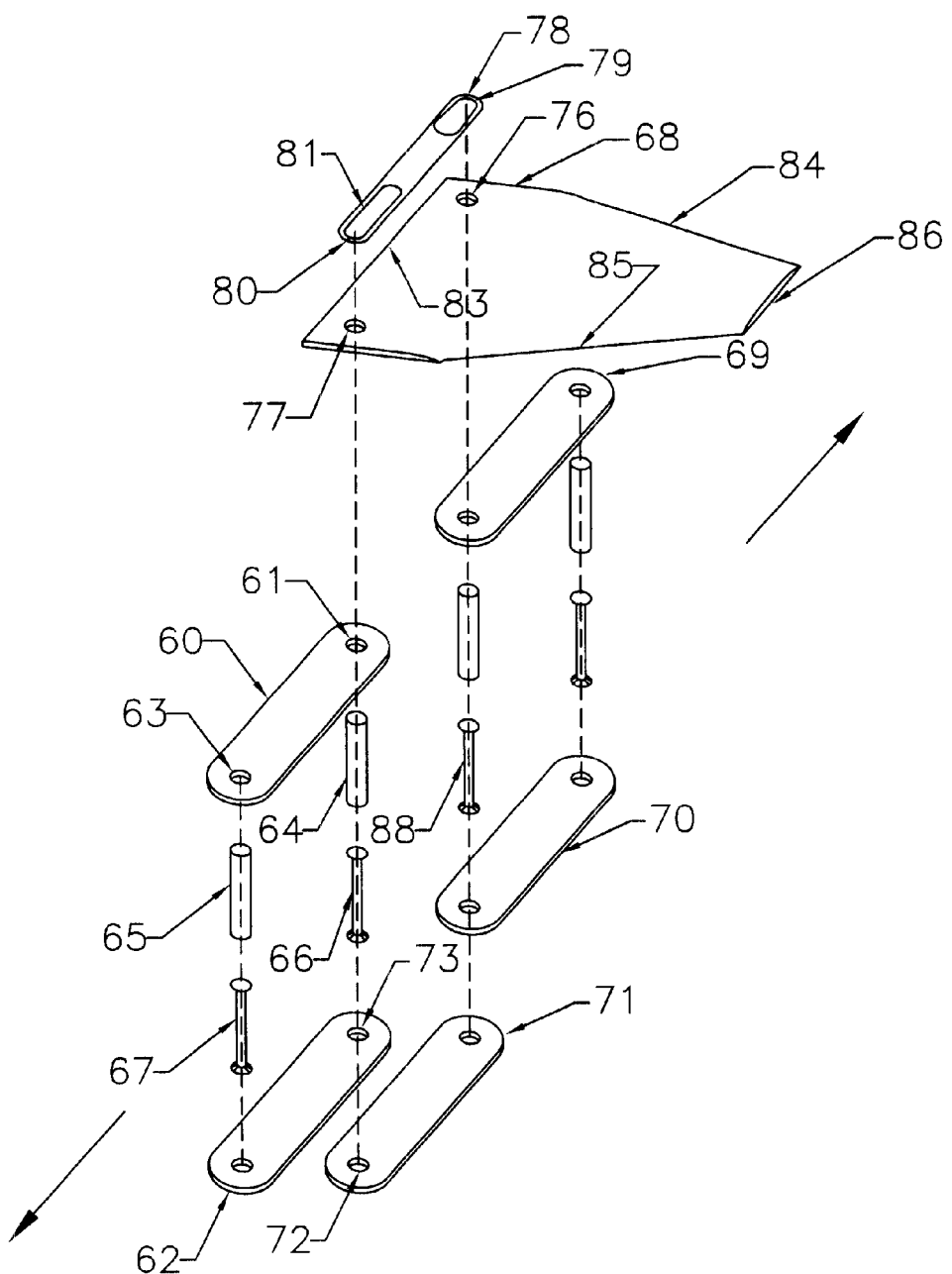
FIG. 4 is an exploded view of the chain link blade cutting mechanism.

The chain mechanism uses link sections, with standard cutting blades 15 attached using removable clips 27. These clips secure the blade in place, and have elongated holes at either end for receiving pins through the chain link, as shown. These are the standard variety having slots near the top to allow the clip to secure around the pin at the slot. An exploded view of the chain is shown in FIG. 3.

The chain links are alternated, with every other link having the blade 85 substitute and act as the upper link in every other link section. Thus, the typical link section is comprised of a lower link number 62 connected to a corresponding link number 60 via pins 66 and 67 within spacer/roller members 64 and 65, all connected accordingly to the holes 73 and 61 (and 62 and 63) to the corresponding and of the next blade/link section utilizing holes 72 and 77. Pins 66 and 67 have headed upper and lower portions, the upper portion of which is held in place by clip 78. At one end of the clip 78 is a pear shaped hole, the large end of which allows the head of the pin 88 to protrude while the narrow portion of the opposite pin 66 is slipped through the slit 80, at which point the clip is snapped into place such that the elongated hole 81 and narrow neck section 79, each of which is smaller than the head of the pin 66 and 88 respectively, hold the clip 78 in place, secure against the blade section 68. Clip 78 has the elongated hole 81 partially to allow the slit 80 to spread slightly while allowing the neck of the pin 66 through, without permanently bending, thus allowing the slit to snap back together once the neck has slipped through said slit. Other connecting clips and pin means are envisioned rather than clip 78, including cotter pins extending through holes in the chain pins.

The blade 68 has a rear portion 83, two holes 76 and 77 corresponding to the width of the holes on a standard chain link. Sides 84 and 85 are sharpened in a blade fashion and come to an essentially point formation at its distal end 86.

In use, it will be seen that the top guide piece allows top guide securing means to occur between the two rock guards, an important feature to allow easy movement of the chain. The top guide piece 7 has extension 11 that is arced so as to allow it to reach over the top of the chain and yet still, at the bottom 12 hold the chain in place beyond the channel and thus guide the chain from outside the channel 5. The outside pressure point here allows for simple, yet most effective, chain guiding. The hold down plate 7 is also easily adjustable by using additional washers to raise it, or commonly available adjustable washers are available. Other adjustable means are envisioned to raise and lower the chain or blades in their cutting path.

The bar 13 runs the entire length of the cutting path, in the preferred mode, with the dual rock guard pieces and their correlating top guide pieces 11, spaced along the bar to create the entire cutting mechanism. Thus is shown an effective, easy to manufacture, use, and maintain, continuous cutting mechanism.

While there have been shown and described particular embodiments of the invention, it will be obvious to those skilled in the art that changes and modifications may be made without departing from the invention or its equivalent and, therefore, it is intended by the appended claims to cover all such changes and modifications fall within the true spirit and scope of the invention.

I claim:

1. A continuous chain link cutting mechanism, for agricultural combines having power drive means for driving a chain, comprised of:

a. A continuous chain coupled to the power drive means, said chain comprised of interconnecting chain link sections utilizing pins, said section having a top and a bottom link, wherein the top links are alternately cutting blades extending outwardly from the chain said blades having a distal tip at a front end and having an opposing back end;

b. Rock guard means having a front distal end and a rear end, a blade receiving slit near the distal end, and having means near the rear end for receiving a channel guide member, with means to attach said rock guard to a continuous support bar;

c. Channel guide means for slidably housing the chain wherein said channel guide means has a front top channel edge and a back top channel edge;

d. Top center guide means attached to the rear end of the rock guard having top guide extension first raising above the chain link mechanism and then extending downward therefrom to near the top of the blade to hold the front of the chain slidably in place so as to allow the chain to slide underneath the top guide, said top guide extension situated essentially between the two rock guard.

2. A continuous chain link cutting mechanism, for agricultural combines having power drive means for driving a chain, comprised of:

a. A continuous chain coupled to the power drive means, said chain comprised of interconnecting chain link sections utilizing pins, said section having a top and a bottom link, wherein the top links are alternately cutting blades extending outwardly from the chain, said blades having a distal tip at a front end and having an opposing back ends utilizing chain pins clip securing means having two end and a hole at either end tightly receiving the chain link pins so as to secure the blades to the chain link pins;

b. At least two rock guard means each having a front distal end and a rear end, a blade receiving slit near the distal end, and having recess means near the rear end for receiving a channel guide member, with means near the rear end to attach said rock guard to a continuous support bar;

c. Polyethylene channel guide means extending perpendicular to the rock guard wherein said channel guide means has a front top channel edge and a back top channel edge wherein the front top channel edge is lower than the back top channel edge;

d. Top center guide means attached to the rear end of the rock guard having top guide extension first raising above the chain link mechanism and then extending downward therefrom to near the top of the blade to hold the front of the chain slidably in place so as to allow the chain to slide underneath the top guide, said top guide extension situated essentially between the two rock guards.

* * * * *